June 7, 1960  R. M. BACON ET AL  2,940,015
SWITCH OPERATING MECHANISM RESPONSIVE TO POWER FAILURE
Filed Sept. 30, 1955  2 Sheets-Sheet 1
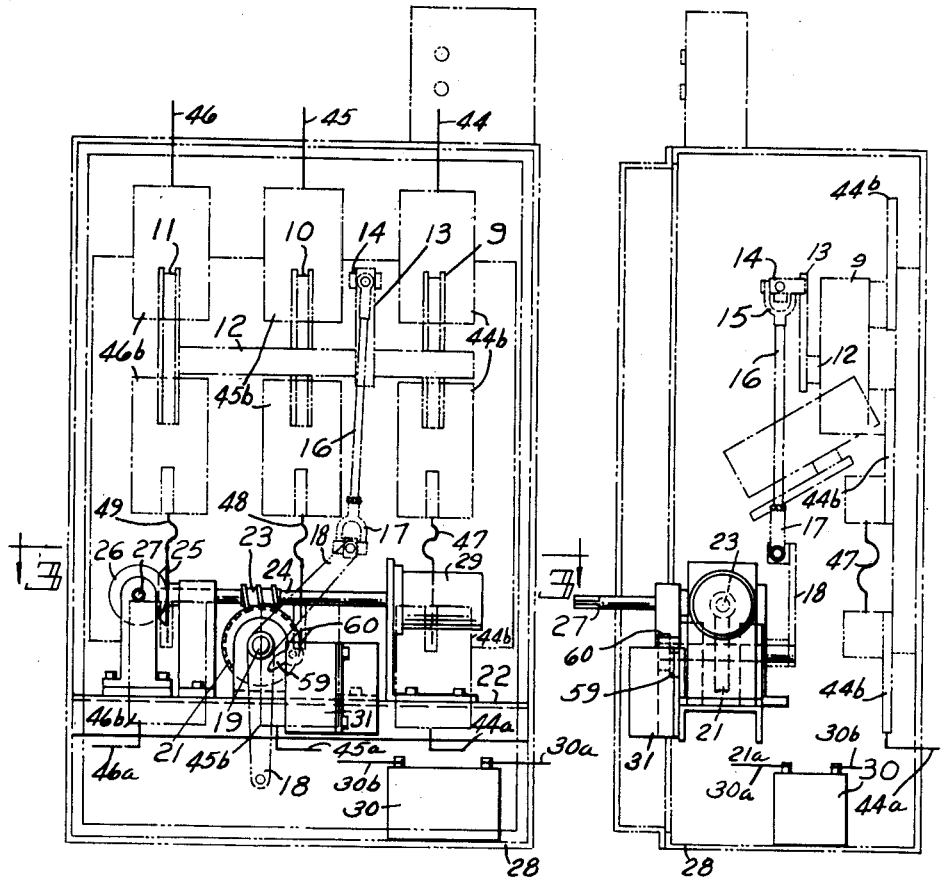
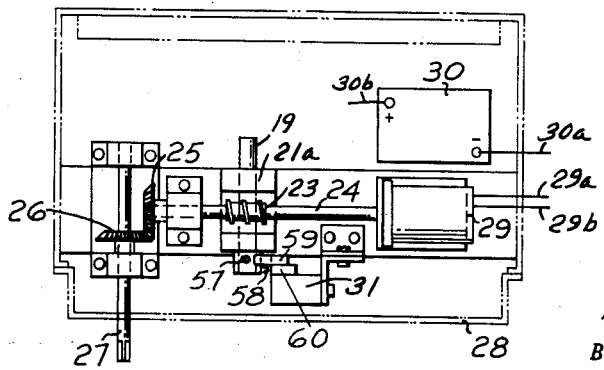
INVENTOR.
ALFRED J. GIRARDOT JR.
ROBERT M. BACON
BY
ATTORNEY

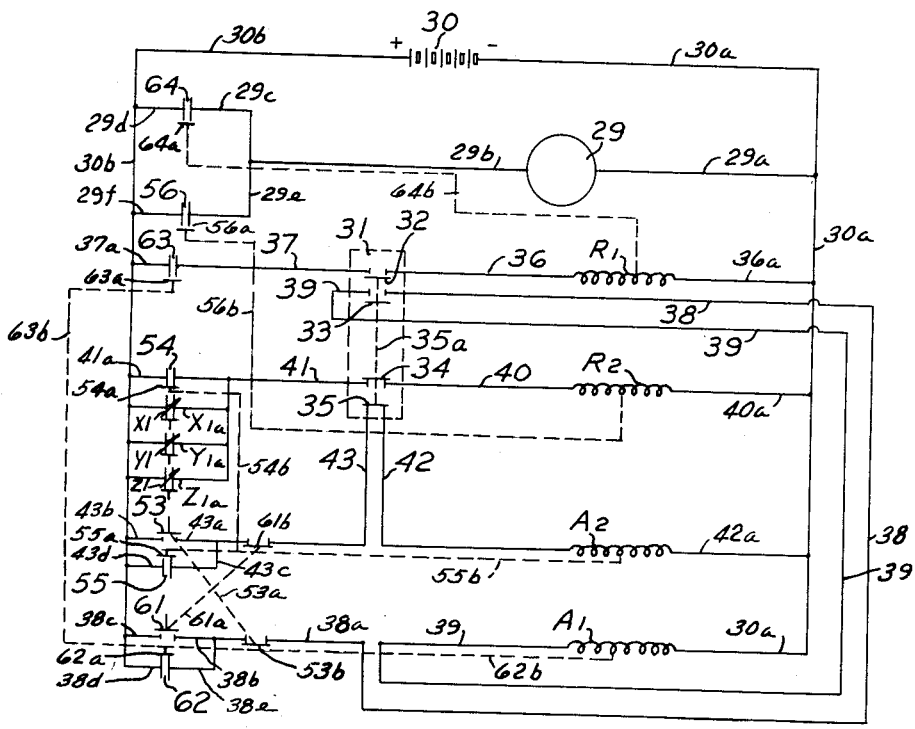

# 2,940,015

SWITCH OPERATING MECHANISM RESPONSIVE TO POWER FAILURE

Robert M. Bacon and Alfred J. Girardot, Jr., both of 16244 Wyoming, Detroit, Mich.

Filed Sept. 30, 1955, Ser. No. 537,781

4 Claims. (Cl. 317—46)

Our invention relates to a new and useful improvement in a switch operation mechanism which is responsive to power failure.

The invention is used in connection with a single or multiple phase power system, the object being that if one or more of the phases fails the switch is automatically operated to cut off the other phases. The invention is particularly useful where a multiple phase system is used for operating machinery and particularly electric motors. Experience has shown that where a three phase system is used, when one of the phases fails, the motor or machinery operated by the current will be damaged and in some cases destroyed unless the current in the remaining phases is promptly broken.

It is an object of the present invention to provide a mechanism to accomplish the breaking of the circuit immediately upon a failure in the circuit and to provide suitable mechanism to accomplish such results.

Other objects will appear hereinafter.

It is recognized that various modifications and changes may be made in the details of the structure illustrated and the present disclosure is considered to be but one embodiment of the invention.

Forming a part of this application are drawings, in which,

Fig. 1 is a front elevational view of a switch showing some of the mechanism attached thereto;

Fig. 2 is a side elevational view of the mechanism shown in Fig. 1;

Fig. 3 is a sectional view taken on line 3—3 of Fig. 1;

Fig. 4 is a wiring diagram used in the invention;

Fig. 5 is another wiring diagram used in the invention.

In the drawings we have indicated switches 9, 10 and 11, each interposed in the circuit of a multiple phase system. These switches are connected by the bar 12 so that the switches may be operated together. Securely mounted on the bar 12 is a plate 13 on which is fixedly connected the yoke 14. This yoke is connected by the universal joint 15 to the operating arm 16. This operating arm 16 is connected by the universal joint 17 to a crank 18. This crank is fixedly mounted on the shaft 19 which is adapted to be rotated by the gear 21, the shaft being journaled in a support 21a extending upwardly from a base 22. This gear 21 is rotated by the worm 23 which is fixedly mounted on, and driven by, the axle 24. This axle 24 carries a bevelled gear 25 fixedly mounted thereon. The bevelled gear 25 meshes with the bevelled gear 26 which is fixedly mounted on the shaft 27 extending to the exterior of the housing 28. The axle 24 is rotated by the reversible electric motor 29 which is connected to a suitable source of electrical energy such as the battery 30 in the manner shown in the diagram of Fig. 4.

In Fig. 1 and Fig. 2 we have shown the crank 18 moved to a position whereby the yoke 14 has been moved to the operating position and the switches are thus in closed position. When the crank 18 moves downwardly to the dotted line position shown in Fig. 1, the yoke 14 will have moved downwardly and the bar 12 will be rocked downwardly to the dotted line position shown in Fig. 2 so that the switches 9, 10 and 11 are opened and retained in open position.

In the diagram shown in Fig. 4 we have indicated a snap limit switch mechanism 31 having blades 32, 33, 34 and 35 carried by a plunger 35a. When the plunger 35a is moved upwardly the blade 32 will be moved into position to engage and establish contacts between the wires 36 and 37. At the same time that the blade 32 engages the contacts to connect the wires 36 and 37, the blade 33 would be moved into engagement with contacts for connecting the wires 38 and 39. When the plunger 35a is moved downwardly, the blade 34 would engage contacts to connect the wires 40 and 41. At the same time blade 35 would engage contacts to connect the wires 42 and 43.

In Fig. 5 we have indicated the feed wires 44, 45 and 46 which are adapted to be connected to a suitable three phase power source and which are connected through the switches 9, 10 and 11 and through the fuses 47, 48 and 49, respectively, to the load side, for example, to a three phase motor, through the lines 44a, 45a and 46a. The aforementioned feed wires, load lines, and fuses are interconnected by the usual bus bars indicated by the numerals 44b, 45b and 46b, as clearly seen in Figs. 1 and 2. Connecting from the center point of the fuse 47 is a wire 50 leading to a delta connected group of relays, the coils of these relays being illustrated in Fig. 5 as X1, Y1 and Z1. A wire 51 similarly connects from the fuse 48 and a wire 52 likewise connects from the center point of the fuse 49 to the relay arrangement. The wires 50, 51 and 52 are connected in parallel with the load wires 44a, 45a and 46a. Relay coil X1 is connected across wires 50 and 51, relay coil Y1 is connected across wires 50 and 52, and relay coil Z1 is connected across wires 51 and 52. It will be seen, that when the switches 9, 10 and 11 are closed to transmit power to the load lines 44a, 45a and 46a, the relay coils X1, Y1 and Z1 will be energized.

In the diagram shown in Fig. 5, the switches 9, 10 and 11 would be closed when power is being transmitted to the load lines 44a, 45a and 46a. In order to manually operate the mechanism to open switches 9, 10 and 11 the normally open push button switch 53 would be manually closed. The closing of switch 53 would complete a circuit from the battery 30 through the lines 30b, and 43b, the switch 53, the line 43a, normally closed switch 61b, line 43, switch 35, and line 42 to one end of the relay coil A2. The other end of the coil A2 is permanently connected to the battery 30 through the lines 42a and 30a. When the switches 9, 10 and 11 are closed, the switch 31 is in the position shown in Fig. 4 so that the plunger 35a is holding the switch plates 34 and 35 in their closed positions to connect the lines 40 and 41, and, the lines 42 and 43, respectively. The manual closing of switch 53 thus energizes relay coil A2, which is connected in the usual manner with a pair of relay contact switches 54a and 55a by means of the usual connecting rods 54b, and 55b, and the contacts 54 and 55 are thus closed. When closed, the contacts 55 function as a holding means or circuit to hold the relay coil A2 in the circuit after the pushbutton 53 is released. The closing of the contacts 54 completes a circuit from the battery 30 through the lines 30b and 41a, the contacts 54, line 41, switch plate 34, and line 40 to one end of the relay coil R2. The other end of the relay coil R2 is permanently connected to the battery 30 by means of the lines 40a and 30a. The closing of the contacts 54 thus energizes the relay coil R2, which is connected in the usual manner with the relay contact switch 56a by means of the usual connecting rod 56b, and the contacts 56 are closed. The closing of contacts 56 completes a circuit from the battery 30 through the lines 30b and 29f, the contacts 56, the line 29e and the line 29b to one side of the motor circuit of the reversible motor 29. The other side of the motor circuit of motor 29 is permanently connected by the lines 29a and 30a to the battery 30. The closing of contacts 56 thus energizes the reversible motor 29 so as to rotate in one direction to open the switches 9, 10 and 11. When the motor 29 rotates it moves the arm 18 to the dotted position shown in Fig. 1. As the motor 29 rotates, the gear 21 is rotated and the shaft 19 is rotated which carries the cam pins 57 and 58. When the switches 9, 10 and 11 have been opened the cam pin 57 will engage the cam 59 and will cam it counterclockwise, as viewed in Fig. 1, and the plunger 35a in the switch 31 will be cammed upwardly, whereby, the switch blades 34 and 35 will be disengaged from their contacts and the circuits to the relay coils A2 and R2 will be broken. The contacts 56 will be opened and the motor 29 will cease to rotate. The switch 31 is of a well known type and is commonly referred to as a cam operated snap closed switch. A suitable switch of this type is sold on the market by Cutler-Hammer Inc., under the designation of Snap Action Limit Switch Type G. When the plunger 35a of the switch 31 is thus moved upwardly as viewed in Fig. 4, the switches 32 and 33 will move into engagement with their respective contacts to connect the lines 36 and 37, and, 38 and 39, respectively.

The relay coils X1, Y1 and Z1 are each connected in the usual manner to their respective relay contacts switches X1a, Y1a, and Z1a by means of the usual connecting rods X1b, Y1b and Z1b, respectively. When the relay coils X1, Y1 and Z1 are deenergized, the relay contact switches X1a, Y1a and Z1a are normally closed so as to close the contacts x1, y1, and z1, respectively. Thus it will be seen, that when the switches 9, 10 and 11 are closed, the relay coils X1, Y1 and Z1 will be energized and the contacts x1, y1 and z1 will be open. However, if any one of the fuses 47, 48 or 49 blows, one or more of the relay coils X1, Y1 and Z1 will be de-energized and their respective contacts x1, y1, or z1, will be closed thereby closing a jumper circuit around the manual switch 54 and energizing the aforementioned circuits as were described hereinbefore under the description of the action which followed when the switch 54 was normally closed. The switches 9, 10 and 11 will then be automatically opened in the same manner as they were opened when the switch 54 was manually operated.

When it is desired to manually close the switches 9, 10 and 11, after they have been manually opened or after they have been automatically opened by the blowing of a fuse, the pushbutton switch 61 is manually closed. It will be noted, that the push-button switches 53 and 61 cannot be energized simultaneously since when one is energized, the other is rendered inoperative as follows. The switch 53 is interconnected by the rod 53a with the switch 53b which is adapted to open the circuit made by the closing of switch 61. Likewise, the switch 61 is interconnected by the rod 61a with the switch 61b which is adapted to open the circuit made by the closing of switch 53.

The manual closing of switch 61 would complete a circuit from the battery 30 through lines 30b and 38c, the switch 61, the line 38b, normally closed switch 53b, line 38a, line 38, switch 33, and line 39 to one end of the coil A1. The other end of the coil A1 is permanently connected to the battery 30 through the line 30a. The manual closing of switch 61 thus energizes relay coil A1, which is connected in the usual manner with a pair of relay contact switches 63a and 62a by means of the usual connecting rods 63b and 62b, and the contacts 63 and 62 are thus closed. When closed, the contacts 62 function as a holding means or circuit to hold the relay coil A1 in the circuit after the pushbutton 61 is released. The closing of the contacts 63 completes a circuit from the battery 30 through the lines 30b and 37a, contacts 63, line 37, switch blade 32, and line 36 to one end of the relay coil R1. The other end of the relay coil R1 is permanently connected to the battery 30 by means of the lines 36a and 30a. The closing of the contacts 63 thus energizes the relay coil R1, which is connected in the usual manner with the relay contact switch 64a by means of the usual connecting rod 64b, and the contacts 64 are closed. The closing of contacts 64 completes a circuit from the battery 30 through the lines 30b and 29d, the contacts 64, the line 29c and the line 29b to one side of the motor circuit of the reversible motor 29. The other side of the motor circuit of motor 29 is permanently connected by the lines 29a and 30a to the battery 30. The closing of contacts 64 thus energizes the reversible motor 29 so as to rotate in the other direction to close the switches 9, 10 and 11. As the motor 29 rotates in the reverse direction to close the switches 9, 10 and 11, the gear 21 is rotated in the opposite direction to that when these switches are being opened and the shaft 19 is also rotated in the reverse direction and the cam pin 58 will engage the cam 60 and will cam it clockwise, as viewed in Fig. 1, and the plunger 35a in the switch 31 will be cammed downwardly, whereby, the switch blades 32 and 33 will be disengaged from their contacts and the circuits to the relay coils A1 and R1 will be broken. The switches 9, 10 and 11 will be closed, and the motor 29 will cease to rotate.

When the switches 9, 10 and 11 are closed and the load side is operating under normal conditions, the relay coils X1, Z1 and Y1 would be energized, thus retaining the mechanism illustrated in Fig. 4 in the position indicated therein. Should a fuse blow, so that any one of these lines 50, 51 or 52 should be broken and become dead, one or two of the coils X1, Y1 or Z1 would become de-energized. This would cause one or two of the relay contacts x1, y1 or z1 to close thus energizing the relay coil R2 and closing the contacts 56 by means of the relay switch 56a to set the motor 29 into operation to rotate in a direction to open the switches 9, 10 and 11. Thus the current to each of the lines on the load side would be broken and the motor or other mechanism operated on the load side would, of course, no longer be energized. In this manner the objects referred to hereinabove would be accomplished.

Should the current from the battery 30 fail, for any reason, the shaft 24 may be manually rotated by placing on the end of the shaft 27 a suitable crank. In this manner the switches 9, 10 and 11 may be manually operated or closed. Of course, the shaft 19 might be also directly rotated by means of a crank attached thereto upon disengagement of the worm 23 from the gear 21. It will, of course, be understood that when the motor 29 is rotating in a direction to close the switches 9, 10 and 11, the switches are actually closed before the motor stops as the motor continues to operate before the switches are fully closed.

It is believed obvious that the relay coil Y1 may be dispensed with so that an open delta may be used in a three phase system. In the use of an open delta coil arrangement the coils X1 and Z1 are alone necessary so that the three lines are connected by two coils, one coil connecting to two of the lines and the third coil connecting to the other line and one of the first two lines.

In a single phase system there are, of course, two lines, each of which is provided with a fuse. When the fuse blows on one of the lines, the electric machine operated by the current would stop; but the other line, on which the fuse had not blown, would still be connected to the machine. When such a situation exists the operator of a machine may become careless thinking that the machine is entirely dead. The present invention may overcome this by the use of one coil, as X1, so that a further object of the invention is the rendering of the equipment safe if one of the lines has "blown." The relay coils X1, Y1 and Z1 may be connected in a Y arrangement, if desired, and the mechanism will function in the same manner as when the delta arrangement is used.

What we claim is:

1. In a switch operating mechanism for use with an electrical power supply system including at least two lines which are each provided with a line switch interconnected between the power and load ends thereof and which are each provided with a fusible fuse interconnected between the line switch in each line and the load end of each line; means for connecting said line switches together for simultaneous movement to open and closed positions; an operating arm connected to said line switches for moving said line switches to open and closed positions; a rotatable member connected to said arm; an electric reversible motor connected to said rotatable member for selectively actuating said member in one direction to operate said arm to open the line switches and in the other direction to operate said arm to close the line switches; a first power circuit adapted to connect said motor to a power source for rotation of the motor in one direction to open said line switches; a second power circuit adapted to connect said motor to the power source for rotation of the motor in the other direction to close said line switches; a first normally open relay switch connected in said first power circuit and a second normally open relay switch connected in said second power circuit; a first control circuit including a third normally open relay switch and the coil of said first relay switch; a second control circuit including a fourth normally open relay switch and the coil of said second relay switch; a third control circuit including a first normally open manually operated closing control switch, and the coil of said third relay switch; a fourth control circuit including a second normally open manually operated opening control switch, and the coil of said fourth relay switch; a cam operated snap action limit switch interconnected in said four control circuits for alternately opening and closing by pairs said first and third, and said second and fourth control circuits, respectively; cam means carried on said rotatable member for operating said limit switch when said rotatable member is rotated by said motor in one direction to open one of the pairs of control circuits to stop rotation of said motor and to close the other pair of control circuits to set up said other pair of control circuits to control rotation of the motor in the other direction; a fifth normally open relay switch connected in said second control circuit in parallel with said fourth relay switch; the coil of said fifth relay switch being connected between the center points of the fuses in said two lines of the power supply system in parallel with said lines; the coil of said fifth relay switch being energized when the line switches are closed and power is being fed to the load end of said lines and said fifth relay switch being adapted to close said second control circuit, if one of said fuses blows, upon de-energization of its coil, whereby, the coil of said second relay switch will be energized and said second relay switch will be operated to close said second power circuit and said motor will be energized and will turn said rotatable member in a direction to actuate said operating arm to open the line switches.

2. The invention as defined in claim 1 wherein: said third control circuit includes a holding circuit connected in parallel with said manually operated closing control switch and which holding circuit is adapted to be closed by said third relay switch upon operation of this switch; and, said fourth control circuit includes a holding circuit connected in parallel with said manually operated opening control switch and which is adapted to be closed by said fourth relay switch upon operation of this switch.

3. In a switch operating mechanism for use with a multi-phase electrical power supply system including at least three lines which are each provided with a line switch interconnected between the power and load ends thereof and which are each provided with a fusible fuse interconnected between the line switch in each line and the load end of each line; means for connecting said line switches together for simultaneous movement to open and closed positions; an operating arm connected to said line switches for moving said line switches to open and closed positions; a rotatable member connected to said arm; an electric reversible motor connected to said rotatable member for selectively actuating said member in one direction to operate said arm to open the line switches and in the other direction to operate said arm to close the line switches; a first power circuit adapted to connect said motor to a power source for rotation of the motor in one direction to open said line switches; a second power circuit adapted to connect said motor to the power source for rotation of the motor in the other direction to close said line switches; a first normally open relay switch connected in said first power circuit and a second normally open relay switch connected in said second power circuit; a first control circuit including a third normally open relay switch and the coil of said first relay switch; a second control circuit including a fourth normally open relay switch and the coil of said second relay switch; a third control circuit including a first normally open manually operated closing control switch, and the coil of said third relay switch; a fourth control circuit including a second normally open manually operated opening control switch, and the coil of said fourth relay switch; a cam operated snap action limit switch interconnected in said four control circuits for alternately opening and closing by pairs said first and third, and said second and fourth control circuits, respectively; cam means carried on said rotatable member for operating said limit switch when said rotatable member is rotated by said motor in one direction to open one of the pairs of control circuits to stop rotation of said motor and to close the other pair of control circuits to set up said other pair of control circuits to control rotation of the motor in the other direction; a fifth, a sixth and a seventh normally open relay switch connected in said second control circuit in parallel with each other and said fourth relay switch; the coils of said fifth, sixth and seventh relay switches being connected in a delta arrangement; each of the fuses in said lines being connected from the center point thereof to one of the connection points between the relay coils in said delta arrangement; the coils in said delta arrangement being energized when the line switches are closed and power is being fed to the load end of said lines; and, said fifth, sixth and seventh relay switches being adapted to close said second control circuit upon failure of one of said fuses, whereby, the coil of said second relay switch will be energized and said second relay switch will be operated to close said second power circuit and said motor will be energized and will turn said rotatable member in a direction to actuate said operating arm to open the line switches.

4. In a switch operating mechanism for use with an electrical power supply system including at least two lines which are each provided with a line switch interconnected between the power and load ends thereof and which are each provided with a fusible fuse interconnected between the line switch in each line and the load line of each line; means for connecting said line switches together for simultaneous movement to open and closed positions; an operating arm connected to said line switches for moving said line switches to open and closed positions; a rotatable member connected to said arm; an electric reversible motor connected to said rotatable member for selectively actuating said member in one direction to operate said arm to open the line switches and in the other direction to operate said arm to close the line switches; a first circuit adapted to connect said motor to a power source and including a first normally open relay switch; a control circuit including the coil for said first relay switch; a second normally open relay switch connected in said control circuit; the coil of said second relay switch being connected between the center points of the fuses in said two lines of the power supply system in parallel with said lines; the coil of said second relay switch being energized when the line switches are closed and power is being fed to the load end of said lines and said second relay switch being adapted to close said control circuit, if one of the fuses blows, upon de-energization of its coil, whereby, the coil of said first relay switch will be energized and said first relay switch will be energized and operated to close said first circuit and said motor will be energized and will turn said rotatable member in a direction to actuate said operating arm to open said line switches.

References Cited in the file of this patent

UNITED STATES PATENTS

| | | |
|---|---|---|
| 1,108,253 | Scott | Aug. 25, 1914 |
| 1,134,752 | Leonard | Apr. 6, 1915 |
| 1,309,027 | Gilbriett | July 8, 1919 |
| 1,692,138 | Orr et al. | Nov. 20, 1928 |
| 1,809,827 | Bower | June 19, 1931 |
| 1,835,343 | Schmett et al. | Dec. 8, 1931 |
| 1,948,519 | Grady | Feb. 27, 1934 |
| 1,988,120 | Hillebrand | Jan. 15, 1935 |
| 2,264,982 | Johnson | Dec. 2, 1941 |
| 2,669,622 | Owens | Feb. 16, 1954 |